(12) United States Patent
Nelson et al.

(10) Patent No.: US 9,356,831 B2
(45) Date of Patent: May 31, 2016

(54) INTELLIGENT NETWORK OPERATION

(71) Applicant: Itron, Inc., Liberty Lake, WA (US)

(72) Inventors: Elliott Adam Nelson, Mankato, MN (US); Kenneth Charles Rigdon, Mapleton, MN (US)

(73) Assignee: Itron, Inc., Liberty Lake, WA (US)

( * ) Notice: Subject to any disclaimer, the term of this patent is extended or adjusted under 35 U.S.C. 154(b) by 133 days.

(21) Appl. No.: 13/717,420

(22) Filed: Dec. 17, 2012

(65) Prior Publication Data

US 2014/0169152 A1 Jun. 19, 2014

(51) Int. Cl.
*H04L 12/24* (2006.01)
*H04W 40/16* (2009.01)
*H04L 12/703* (2013.01)
*H04W 84/18* (2009.01)
*H04L 12/729* (2013.01)
*H04W 40/10* (2009.01)
*H04L 12/727* (2013.01)

(52) U.S. Cl.
CPC ............ *H04L 41/0803* (2013.01); *H04L 45/28* (2013.01); *H04W 40/16* (2013.01); *H04L 45/121* (2013.01); *H04L 45/125* (2013.01); *H04W 40/10* (2013.01); *H04W 84/18* (2013.01)

(58) Field of Classification Search
CPC ............... H04W 88/06; H04W 76/027; H04N 1/00204; H04N 2201/0039; H04N 2201/0084
USPC ........................... 370/216, 241; 455/436, 466
See application file for complete search history.

(56) References Cited

U.S. PATENT DOCUMENTS

| | | | |
|---|---|---|---|
| 7,110,778 B2 * | 9/2006 | Davis et al. | 455/456.1 |
| 7,417,557 B2 * | 8/2008 | Osterloh et al. | 340/870.03 |
| 7,573,825 B2 * | 8/2009 | Iffland | 370/241 |
| 8,781,416 B1 * | 7/2014 | Clark et al. | 455/115.3 |
| 2005/0288054 A1 * | 12/2005 | Sakaniwa | 455/550.1 |
| 2007/0045424 A1 * | 3/2007 | Wang | 235/462.46 |
| 2010/0136928 A1 * | 6/2010 | Rofougaran | 455/90.2 |
| 2010/0285827 A1 * | 11/2010 | Kim et al. | 455/517 |
| 2011/0170484 A1 * | 7/2011 | Nagai et al. | 370/328 |
| 2011/0319084 A1 * | 12/2011 | Meshkati et al. | 455/436 |
| 2012/0063365 A1 * | 3/2012 | Craine | 370/255 |

FOREIGN PATENT DOCUMENTS

EP       1760958 A2    3/2007

OTHER PUBLICATIONS

PCT Search Report and Written Opinion mailed Feb. 13, 2014 for PCT Application # PCT/US13/67859, 9 pages.

* cited by examiner

*Primary Examiner* — Jamal Javaid
(74) *Attorney, Agent, or Firm* — Lee & Hayes, PLLC

(57) ABSTRACT

A node may be configured for operation in an intelligent network environment, wherein the node communicates via different modes of communication. The node selects a first mode of communication (e.g., mesh network mode). The node communicates via the first mode of communication. In response to determining a first condition (e.g., interference), the node selects a second mode of communication. The node then communicates via the second mode of communication. In response to determining a second condition (e.g., interference ceases), the node selects the first mode of communication and communicates via the first mode of communication.

20 Claims, 5 Drawing Sheets

INTELLIGENT NETWORK OPERATION

BACKGROUND

Networks can be used to send and receive data to and from many different locations. A network may include nodes that transmit data to and from other nodes or portions of the network. For example, a network of electricity, natural gas and/or water meters can be used to monitor consumption for utility customers at many locations.

One example of a utility network operates according to a mobile network mode or state. In the mobile network mode, meters may transmit consumption messages over one or more radio frequencies (RF). The transmitted consumption messages may be received by a mobile or portable device, which may include a vehicle-based or handheld radio.

Other utility network operates according to a fixed network mode or state. For example, in a star network, metering devices are configured as nodes in a fixed network wherein consumption messages are passed from nodes directly to a root node or other data collector. Thus, the network of devices forms a "star," in which the root node is at the center of the star.

Another example of a fixed network is a mesh network. In a mesh network, metering devices are configured as nodes in a fixed network wherein consumption messages can be passed between nodes. A root node can receive data from a mesh node through a pathway of one or more intermediary nodes. Similarly, a root node can send data to a mesh node through a pathway of one or more intermediary nodes. Thus, the network of devices forms a "mesh" of interconnected nodes.

Traditionally, each node has been configured for and capable of communicating using a specific one of these types of utility communications networks. Thus, a node of a mobile/handheld network has been limited to communication via the mobile/handheld infrastructure, regardless of the availability of star or mesh networks. Likewise, star network devices could only communicate via the star network infrastructure and not mobile/handheld or mesh, and mesh network devices could only communicate via the mesh network infrastructure and not mobile/handheld or star.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
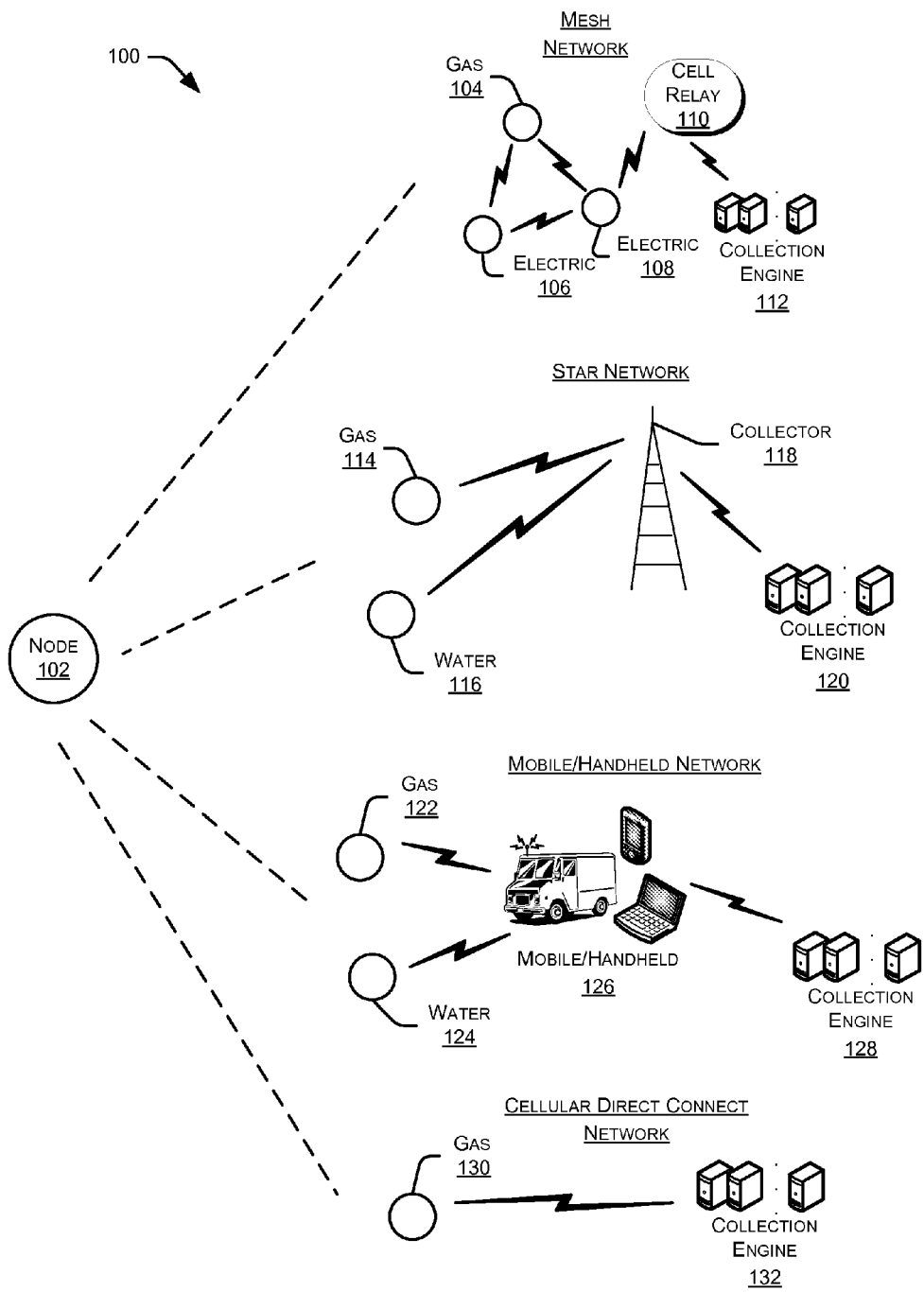
FIG. 1 is schematic diagram showing an example node capable of intelligently switching between multiple modes based on one or more conditions.

The optimal or least costly network mode to implement depends on various conditions. For example, the "read cost" or "cost of transmission" may be affected by various conditions. Examples of conditions that can affect the cost of transmission are infrastructure costs, power supply and battery life impact, RF performance, and impact to end user functionality. Because conditions can change, the optimal or least costly network mode to use for a particular location or node in the network can also change.

The disclosure describes techniques for performing intelligent network operation by one or more nodes in a network. The one or more nodes are capable of communicating via multiple modes of communication, such as mesh network mode, star network mode, mobile network mode, and cellular direct connect mode, for example. In one example, a utility meter, such as a gas meter, water meter, or electricity meter, may be a node (e.g., "endpoint") capable of operating in multiple modes of communication. Furthermore, the endpoint may be battery-powered.

The endpoint can operate intelligently under a variety of local network conditions. The endpoint can sense, via network discovery, the best network mode and sub-mode to operate under. The modes and sub-modes may be ordered in priority based on an overall "read cost" factor or a cost of transmission, which takes into account factors such as infrastructure cost, power supply and batter life impact, RF performance (e.g., "link margin"), and impact to end user functionality. For example, a default priority order for communication modes may be: mesh network mode, star network mode, cellular direct connect mode, and mobile network mode. Thus, if an endpoint is communicating via a particular mode, but determines that the cost of transmission for communicating via that mode has become higher than communicating in a lower-priority mode, then the endpoint will switch to communicating via the lower-priority mode. The endpoint may repeat this process as necessary until the lowest-priority mode is reached. Furthermore, a node may be capable of communicating in all or only some of the communication modes described herein, and potentially other communication modes.

Each mode of communication may have sub-modes. The sub-modes are variants of the mode and include modification of parameters such as transmit power, data rate, protocol, modulation schemes, and/or use of forward error correction (FEC), in order to achieve the desired functionality at an acceptable read cost. If communication is lost for a threshold period of time (e.g., during a network outage), the endpoint can re-initiate network discovery and search for another mode of communication, stepping through all of the modes, in priority order, as necessary, or the endpoint may return to the last mode used. The final mode in the order may be a contingency mode (e.g., mobile or handheld mode). This process of stepping through modes allows for network self-healing and contingency read capabilities. While operating under a particular mode of communication, the endpoint may periodically, continuously, or upon certain conditions (e.g., change in network traffic) scan or search for lower-cost communication modes. Thus, once a network problem has been resolved or mitigated, the endpoint can return to a higher priority communication mode with a lower cost of communication (e.g., reading data or transmitting data).

The discussion herein includes several sections. Each section is intended to provide examples of techniques and/or structures, but is not intended to indicate elements which must be used and/or performed. A section entitled "Example Modes of Communication" discusses aspects of communication within different types of networks. A section entitled "Example of Intelligent Network Operation" discusses aspects of changing communication modes in response to changing conditions. A section entitled "Example Meter" discusses example construction of a meter for intelligent network operation. A section entitled "Examples Methods of Intelligent Network Operation" discusses example operations to perform intelligent network operation. This brief introduction is provided for the reader's convenience and is not intended to describe and/or limit the scope of the claims or any section of this disclosure.

Example Modes of Communication

FIG. 1 shows examples of different modes of communication for networks 100 that a gas meter may operate under. Each network in networks 100 includes a plurality of utility meters that may measure consumption of electricity, natural gas, water and/or other consumable resources. Each meter may be integrated with a radio and data processing functionality, and may constitute a node within one of networks 100.

In the example, node 102 is representative of a gas meter, water meter, electronic meter, or other network communication device that transmits information such as consumption data. Node 102 is representative of any node in one of networks 100.

For example, node 102 may represent gas 104, which is a node in a mesh network. Other nodes in the mesh network include electric 106 and electric 108, which transmit information that includes electricity consumption data. Other transmitted information may include downstream flows of packets, which may include commands and information passing through the mesh network and originating from a central office or another location. The information within the mesh network may include upstream flows of packets, which may include consumption data. Both the downstream data flows and upstream data flows may be made over RF links between various nodes and/or other networks. Electric 108 sends information from gas 104, electric 106, and electric 108 to cell relay 110, which forwards the information to collection engine 112 or another data storage and/or processing facility.

As another example, node 102 may operate as gas 114, which is a node in a star network. Another node in the star network is water 116, which transmits water consumption data. Gas 114 and water 116 communicate directly with collector 118, which is the center node of the star network. Thus, gas 114 and water 116 send the consumption data to collector 118, which forwards the consumption data to collection engine 120 or other data storage and/or processing facility.

As another example, node 102 may operate as gas 122, which is a node in a mobile network that transmits consumption data to mobile/handheld 126 as the mobile/handheld traverses a route. Another example node in a mobile network is water 124, which transmits water consumption data to mobile/handheld 126. Mobile/handheld 126 forwards the consumption data to collection engine 128 or other data storage and/or processing facility.

Mobile/handheld 126 may be a hand-held device or vehicle-based device. Mobile/handheld 126 may include a radio, a processor, memory and software, and which may be guided and/or operated by an individual. Gas 122 and water 124 may communicate with mobile/handheld 126 by means of RF transmissions 106. The transmissions 106 may be broadcast periodically, randomly or at another interval or frequency. In some cases, gas 122 or water 124 may communicate with mobile/handheld 126 through a physical connection, such as a communication cable, interface, or optical port.

As another example, node 102 may operate as gas 130, which is a node in a cellular direct connect network that transmits consumption data to collection engine 132 or other data storage and/or processing facility. In some examples, gas 130 may transmit the consumption data to a cell relay, collector, or other device before the consumption data is transmitted to collection engine 132 or other data storage and/or processing facility.

Example of Intelligent Network Operation

Figure 2:
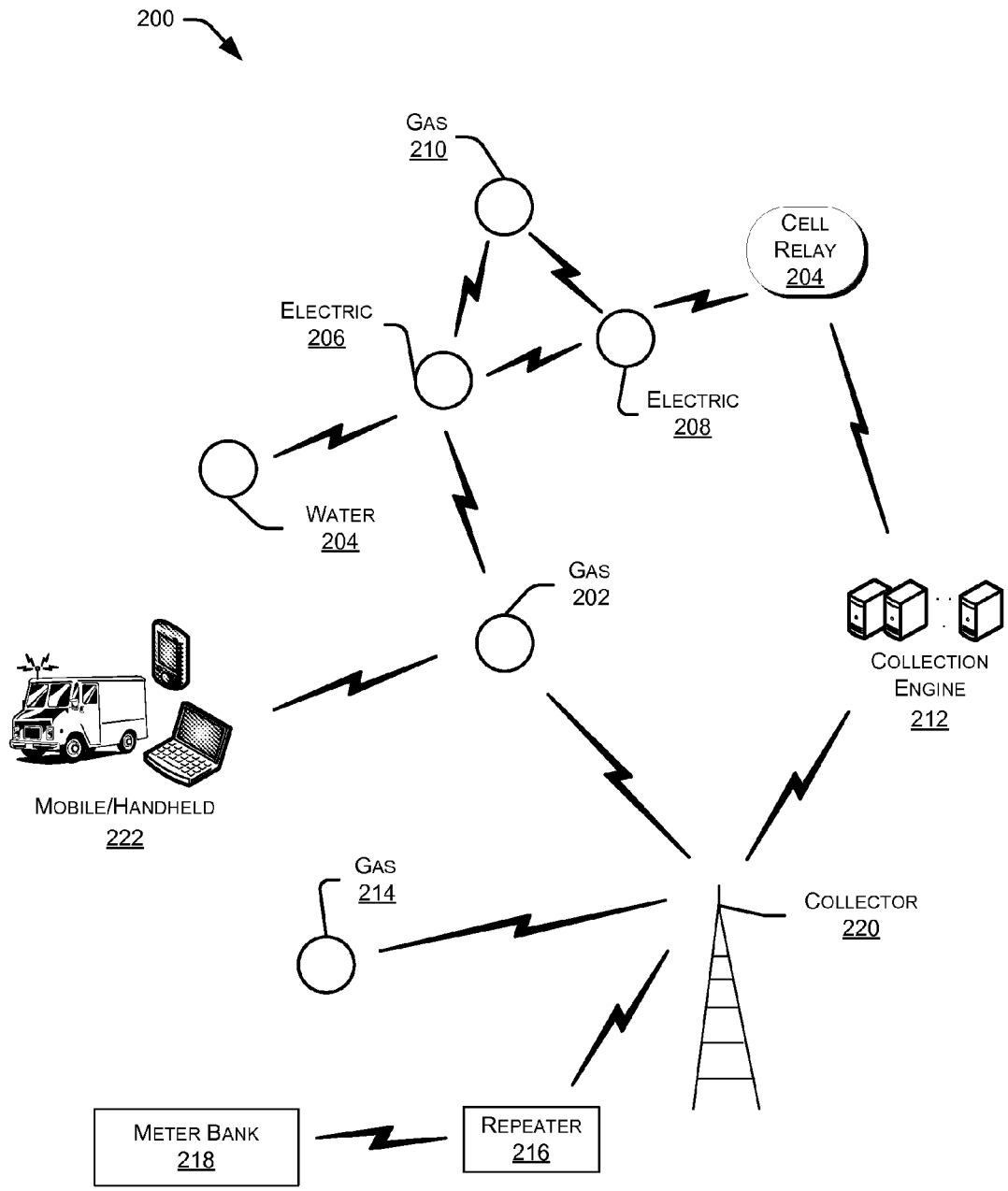
FIG. 2 is schematic diagram showing additional details of the node of FIG. 1.

FIG. 2 shows an example of a gas meter that changes its mode of communication for a network 200 in response to a condition. Gas 202 is an example of node 102 of FIG. 1. As described in further detail below, gas 202 is capable of employing multiple modes of communication for network 200. Network 200 includes a plurality of utility meters that measure consumption of electricity, natural gas, water or other consumable resource. Each meter may be integrated with a radio and data processing functionality, and may constitute a node within network 200. Any or all nodes in network 200 may include the capability to change its communication mode.

In the example, water 204, electric 206, electric 208, and gas 210 represent gas, water or electric meters that transmit information including water, electric, or gas consumption data through a mesh network. Similar to the mesh network of FIG. 1, electric 208 sends information from water 204, electric 206, electric 208, and gas 210 to cell relay 210, which forwards the information to collection engine 212.

Gas 214, repeater 216, and meter bank 218 are nodes of a star network. Meter bank 218 is a group of utility meters (e.g., at least one of gas, water, or electricity meters) that sends utility consumption data to repeater 216, which sends the consumption data to collector 220. Gas 214 sends gas consumption data directly to collector 220. As in the star network of FIG. 1, collector 220 sends the data to collection engine 212.

In the example, gas 202 is capable of communicating via multiple modes of communication for network 200. Gas 202 can communicate via mesh mode of communication, star network mode of communication, or mobile/handheld mode of communication. Gas 202 may also communicate via one or more other modes of communication suitable for transmitting data. For example, gas 202 may communicate via direct cellular connection (e.g., communicate directly with cell relay, collector, collection engine, or other device). In response to a new or changed condition, gas 202 changes from one mode of communication to a different mode of communication. For example, using mesh network mode may become more costly than using star network mode or mobile network mode, because a new source of interference causes a negative impact on the RF performance for gas 202 or because an upstream node may become unavailable due to malfunction, maintenance, etc. Thus, gas 202 may initially be communicating with electric 206 as a part of the mesh network, but after a new condition occurs, gas 202 may stop communicating with electric 206 and instead initiate communication with collector 220 (star network mode). Furthermore, if another condition occurs or if gas 202 is unable to communicate in the current mode, gas 202 may stop communicating with collector 220 and instead initiate communication with mobile/handheld 222 or attempt to initiate communication with mobile/handheld 222. Mobile/handheld 222 will then send consumption information from gas 202 to collection engine 212 after receiving the consumption information from gas 202.

As another example, gas 202 initially selects mesh communication mode for network 200 (e.g., configures its protocol stack) and selects an appropriate sub-mode. Gas 202 communicates via mesh communication mode using a normal sub-mode, if there is a strong communication signal (e.g., cost of transmission is less than a threshold cost). In response to a condition (e.g., interference, exceeding the threshold cost), gas 202 selects an interference sub-mode. For example, the interference sub-mode may cause gas 202 to reduce white noise performance to achieve processing gain in the presence of interferers, while maintaining transmission power and data rates. In response to another condition, gas 202 selects a long range sub-mode. For example, the long range sub-mode may cause gas 202 to enhance white noise performance, and may cause a reduction in the effective data rate. If gas 202 is unable to communicate with the mesh network within a threshold amount of time or if the cost of transmission for gas 202 exceeds a cost threshold amount, gas 202 selects a different mode of communication. In some cases, gas 202 selects star network mode for network 200 (e.g., configures its protocol stack) and may also select an appropriate sub-mode.

Thus, gas 202 communicates via star communication mode using a normal sub-mode, if there is a strong communication signal. In response to a condition (e.g., interference), gas 202 selects an interference sub-mode, as described above. In response to another condition, gas 202 selects a long range sub-mode, as described above. If gas 202 is unable to communicate with the mesh network within a threshold amount of time or if the cost of transmission for gas 202 exceeds a cost threshold amount, gas 202 selects the different mode of communication. In some cases, gas 202 selects the mobile network mode for network 200 (e.g., configures its protocol stack). Gas 202 then communicates via the mobile network mode.

Gas 202 periodically, continually, or on occurrence of an event, reevaluates the cost of transmission to determine if the cost of transmission exceeds a cost threshold. If the cost of transmission exceeds a cost threshold, gas 202 evaluates the cost of transmission of each other communication mode to determine the mode with the least cost of transmission. After determining the mode with the least cost of transmission, gas 202 selects that mode and communicates via that mode (e.g., mesh, star, or mobile).

For example, the cost of transmission may exceed the cost threshold in response to a failure of gas 202 to communicate within a threshold amount of time. The cost of transmission may also exceed the cost threshold in response to failure of the node to communicate after a threshold number of attempts to communicate. As another example, the cost of transmission may also exceed the cost threshold in response to interference with the current mode of communication for gas 202. The cost of transmission my also exceed the cost threshold in response to gas 202 communicating at a data rate below a threshold data rate. The cost threshold may be a measure of at least one of cost to battery life for the battery in gas 202, cost to RF performance for gas 202, financial cost to achieve successful communication for gas 202, or cost to end user functionality. Any other measurement suitable for measuring transmission cost may be used.

In some embodiments, mesh network mode is designated as the highest priority mode, followed by star network mode, and then followed by mobile mode. Thus, if gas 202 is operating in a mode other than the highest priority mode, then gas 202 will periodically determine if it can change modes to a higher mode (e.g., from star network mode to mesh network mode) by periodically evaluating the transmission cost for the current communication link. For example, upon determining that the cost of transmission for mesh network mode would not exceed a cost threshold, then gas 202 will stop communicating using its current mode (e.g., star network mode or mobile/handheld network mode) and selects mesh network mode to begin communicating in mesh network mode.

Thus, gas 202 may cycle through communication modes and submodes in order of priority, or gas may switch directly to the best mode (e.g. least cost of transmission) based upon detected environmental conditions. An example of a priority order of communication modes and sub-modes from highest to lowest priority is: mesh-normal, mesh-interference avoidance, mesh-long range, star-normal, star-interference avoidance, star-long range, mobile/handheld-normal, mobile/handheld-interference avoidance. In some examples, a different priority order is used. Furthermore, other modes and sub-modes suitable for communication may be added or substituted to create a different priority order.

Example Meter

Figure 3:
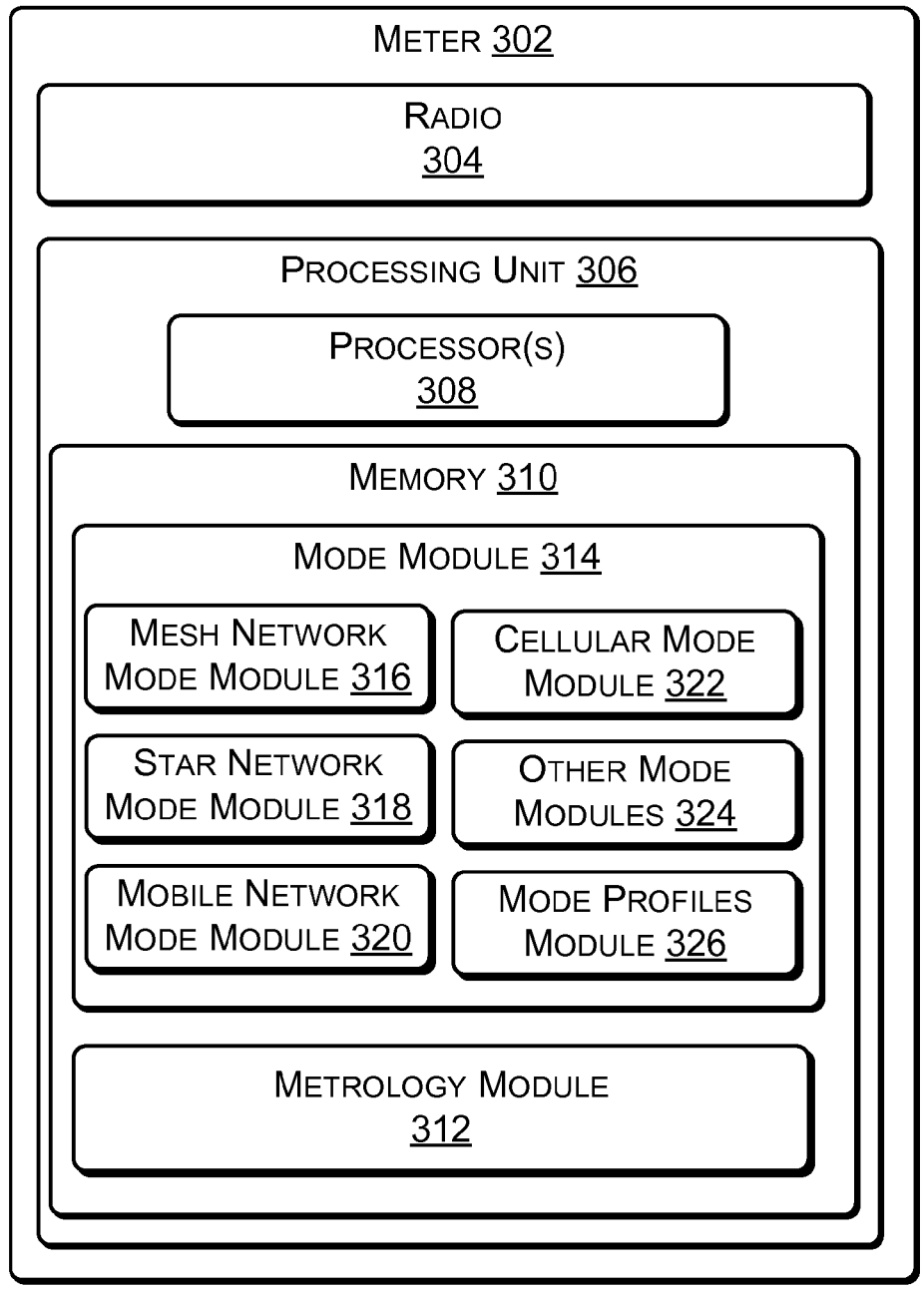
FIG. 3 is a block diagram showing an example of a utility meter configured for intelligent network operation.

FIG. 3 is a block diagram showing an example endpoint or meter 302, operable within networks 100 of FIG. 1 and network 200 of FIG. 2. Meter 302 is an example of node 102 of FIG. 1 and gas 202 of FIG. 2. Meter 302 may be configured for intelligent network operation.

In one example, meter 302 may include radio 304 and processing unit 306. Radio 302 may provide two-way RF communication with cell relay 210, collector 220, mobile/handheld 222, collection engine 212, and/or other endpoints. Processing unit 306 may include processor 308 and memory 310 and/or other hardware device(s), such as an application specific integrated circuit (ASIC), a gate array or other hardware-based logic device.

Meter 302 may include software functionality configured as one or more "modules" within memory 310. Accordingly, while various "modules" are discussed, their functionality and/or similar functionality could be arranged differently, as understood by those trained in the art.

Metrology module 312 may be configured to receive consumption data that is obtained from a metrology sensor (which may be integral to or associated with the endpoint/meter). Metrology module 312 may provide the consumption data to cell relay 210, collector 220, mobile/handheld 222, collection engine 212, and/or other endpoints by RF transmission or other means of communication. The consumption data may be formatted and/or packetized in a manner expected by cell relay 210, collector 220, mobile/handheld 222, collection engine 212, and/or other endpoints. In one example, in a window or period of time following transmission of the consumption data, radio 304 is capable of receiving data and/or commands. At other times, radio 304 may be turned off to conserve power.

Mode module 314 may be configured to include mesh network mode module 316, star network mode module 318, mobile network mode module 320, and cellular mode module 322. Meter 302 uses mesh network mode module 316, star network mode module 318, mobile network mode module 320, or cellular mode module 322 to select and communicate using mesh network communication, star network communication, mobile network communication, or cellular direct connect network communication, respectively. In response to determining a condition, meter 302 may select and communicate via a different mode of communication and communication using mesh network mode module 316, star network mode module 318, mobile network mode module 320, or cellular mode module 322. Thus, meter 302 may switch to a different mode of communication in response to a condition (e.g., interference, transmission cost exceeding a cost threshold, etc.). Other mode modules 324 includes one or more other mode modules may select and communicate via one or more other modes of communication, in addition to the communication modes discussed above.

Mode profiles module 326 includes a list of each mode of communication. Mode profiles module 326 includes profiles of conditions under which meter 302 switches from one communication mode to another. Thus, mode profiles module 326 determines which mode meter 302 switches to in response to various conditions.

Examples Methods of Intelligent Network Operation

Figure 4:
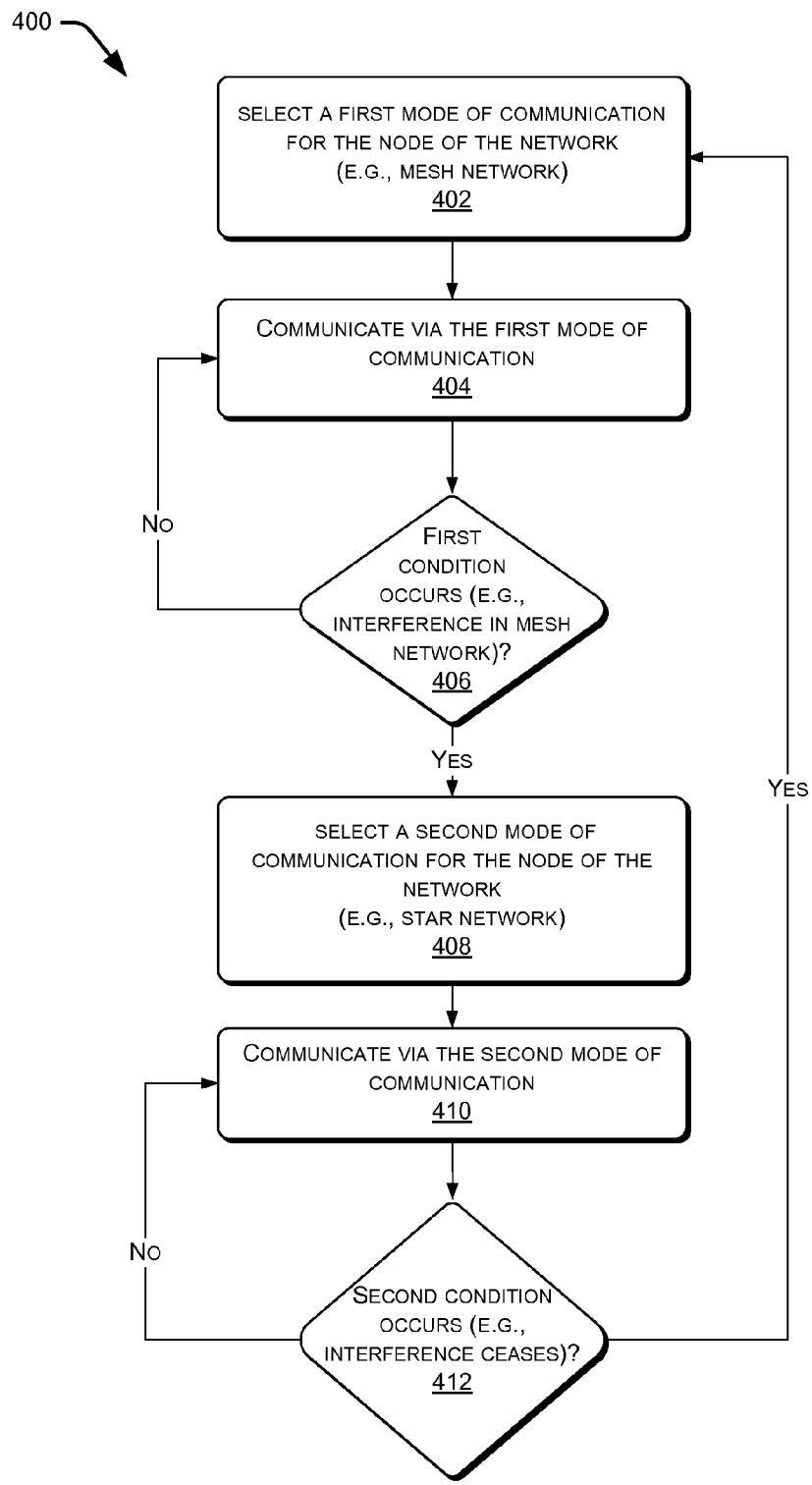
FIG. 4 is a flow diagram illustrating example operation of a node, particularly showing how a node can implement intelligent network operation.
Figure 5:
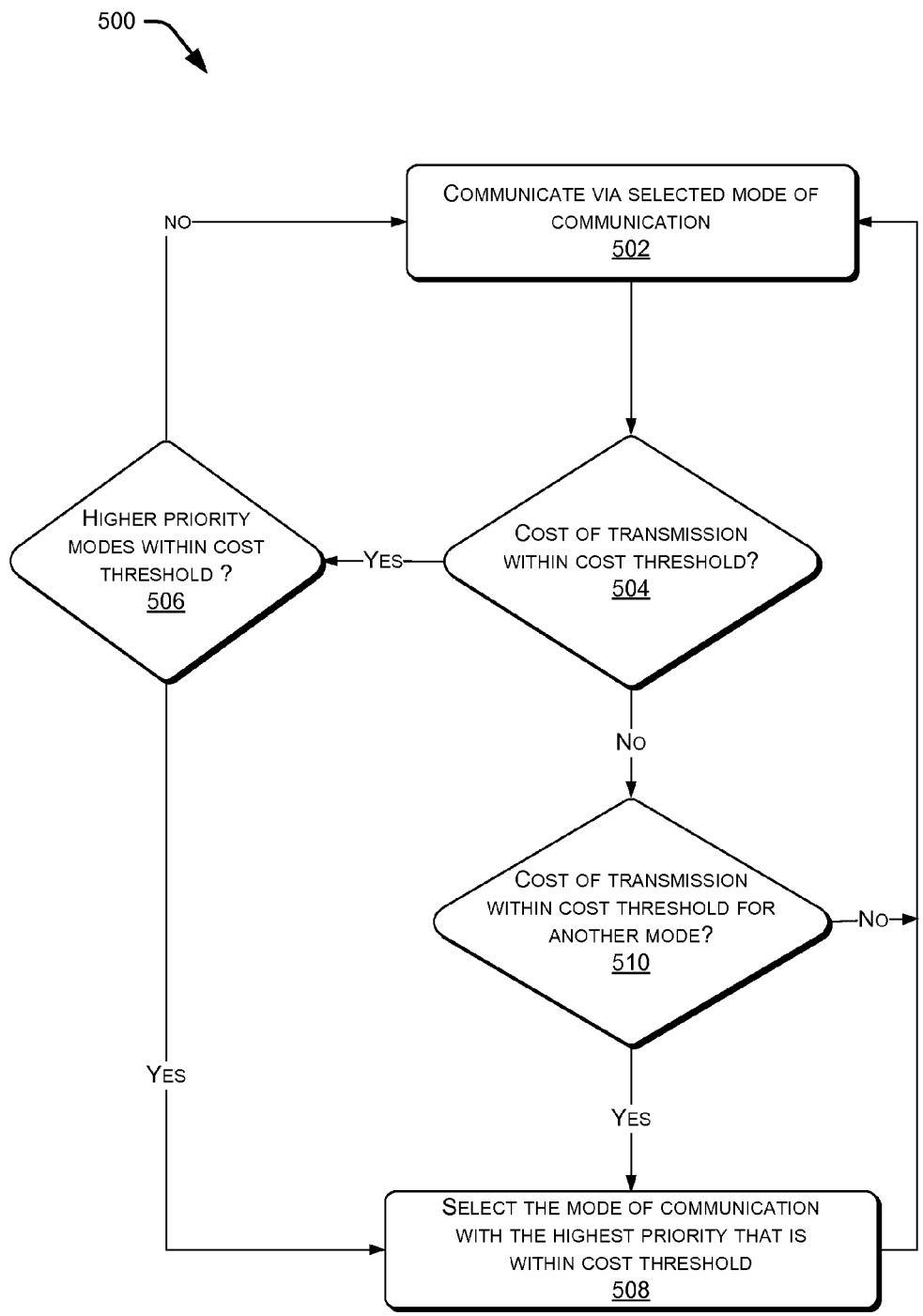
FIG. 5 is a flow diagram illustrating example operation of a node, particularly showing how a node can implement intelligent network operation.

FIGS. 4 and 5 show operations, methods and techniques that may be represented by a collection of acts, blocks or operations in a logical flow graph, which represent a sequence of operations that can be implemented and/or executed by hardware, software, or a combination thereof. In one example, one or more functional blocks may be implemented by aspects including a microprocessor, a microcontroller, one or more memory devices, application specific integrated circuits, software blocks, subroutines and/or programs, etc.

Memory is an example of computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Any such computer-readable media (e.g., memory 310 of FIGS. 1 and 2) may be part of a system or device (e.g., node 102 or meter 312). Moreover, the computer-readable media may include computer-executable instructions that, when executed by the processor(s), perform various functions and/or operations described herein. Such computer- and/or processor-readable memory and/or media may retain the instructions in a persistent and/or non-transitory manner.

The operations 400 and 500 are illustrated as collections of blocks and/or arrows in logical flowcharts representing a sequence of operations that can be implemented in hardware, software, firmware, or a combination thereof. The order in which the blocks are described is not intended to be construed as a limitation, and any number of the described operations can be combined in any order to implement the method, or alternate methods. Additionally, individual operations may be omitted from the method without departing from the spirit and scope of the subject matter described herein. In the context of software, the blocks represent computer instructions stored in memory or computer-readable media that, when executed by one or more processors, perform the recited operations. In the context of hardware, the blocks may represent one or more circuits (e.g., application specific integrated circuits—ASICS) configured to execute the recited operations.

FIG. 4 is a flow diagram illustrating example operation 400 of an endpoint, particularly showing how a node or endpoint (e.g., node 102 or meter 302 of FIG. 3) can implement intelligent network operation. The method 400 may, but need not, be implemented using networks 100, node 102, and/or meter 302. At operation 402, the node selects a first mode of communication for the node of the network (e.g., mesh network mode). At operation 404, the node communicates via the first mode of communication (e.g., mesh network mode).

At operation 406, the node determines if a first condition occurs (e.g., interference affecting communications in the mesh network). As discussed above, the node may determine if a first condition occurs by monitoring a cost of transmission to determine whether the cost of transmission exceeds a cost threshold. Thus, the first condition may be that the cost of transmission exceeds a cost threshold. If the first condition does not occur, then at operation 404 the node continues to communicate via the first node of communication.

If the first condition does occur (e.g., interference, exceeding the threshold of the cost of transmission), then at step 408, the node selects the second mode of communication for the node of the network (e.g., star network mode). Selecting a second mode of communication may comprise performing a network scan, determining whether other devices on the network are available for network association, evaluating link quality for the node for one or more communication modes, determining the mode of communication with the least cost of transmission, and/or any other suitable technique for determining the second mode of communication. At operation 410, the endpoint communicates via the second mode of communication (e.g., star network mode).

At operation 412, the node determines if a second condition occurs (e.g., the interference ceases). If the second condition does not occur, then at operation 410 the node continues to communicate via the second node of communication. If the second condition does occur (e.g., the interference ceases), then at step 402, the node selects the first mode of communication for the node of the network (e.g., mesh network mode). In some examples, if the second condition occurs, the node selects a third mode of communication and repeats the method steps using the third mode of communication instead of the first mode of communication.

FIG. 5 is a flow diagram illustrating example operation 500 of an endpoint, particularly showing how a node or endpoint (e.g., node 102 or meter 302 of FIG. 3) can implement intelligent network operation. The method 500 may, but need not, be implemented using networks 100, node 102, and/or meter 302. At operation 502, the node communicates via a selected mode of communication (e.g., mesh network mode). At operation 504, the node determines whether the cost of transmission for the current mode of communication is within a cost threshold. If the node determines that the cost of transmission is within a cost threshold, then at step 506 the node determines whether a communication mode with higher priority than the currently selected communication mode is within the cost threshold. If the node determines that none of the higher priority communication mode is within the cost threshold, then the node returns to operation 502.

If the node determines that a higher priority communication mode is within the cost threshold, then at operation 508 the node selects the mode of communication with the highest priority that is within the cost threshold. The node than communicates via the selected mode at operation 502.

Returning to operation 504, if the node determines that the cost of transmission for the current mode of communication is not within a cost threshold, then at step 510 the node determines whether the cost of transmission is within the cost threshold for another communication mode. If the cost of transmission is not within the cost threshold for another communication mode, then the node returns to operation 502. In some example methods, the node stops communicating until one of the communication modes is within the cost threshold, then begins communicating again.

At step 510, if the cost of transmission is within the cost threshold for another communication mode, then at step 508 the node selects the mode of communication with the highest priority that is within the cost threshold. The node then communicates via the selected mode at operation 502.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   under control of a node of a network configured with computer-executable instructions:
   selecting, by the node, a first mode of communication for the node of the network;
   communicating, by the node, via the first mode of communication;
   responsive to determining, by the node, a first condition, selecting, by the node, a second mode of communication for use by the node to communicate, wherein the selecting, by the node, the second mode of communication comprises:
     querying a data structure including one or more modes of communication, the data structure establishing a priority rank for the one or more modes of communication; and
     determining the second mode of communication based at least in part on its priority rank;
   communicating, by the node, via the second mode of communication;
   searching, by the node, a predetermined priority listing to determine a higher priority mode of communication, the predetermined priority listing including a mesh network mode being designated higher priority than a star network mode, the star network mode being designated higher priority than a mobile mode;
   determining whether the higher priority mode of communication has a lower cost of communication than the second mode of communication; and
   upon determining that the higher priority mode of communication has a lower-cost of communication than the second mode, communicating, by the node, via the higher priority mode of communication.

2. The method of claim 1, wherein the first condition comprises a cost of transmission exceeding a cost threshold.

3. The method of claim 2, wherein the cost of transmission exceeds the cost threshold in response to failure of the node to communicate via the first mode of communication within a threshold amount of time.

4. The method of claim 2, wherein the cost of transmission exceeds the cost threshold in response to failure of the node to communicate via the first mode of communication after a threshold number of attempts to communicate.

5. The method of claim 2, wherein the cost of transmission exceeds the cost threshold in response to interference with the communicating via the first mode of communication.

6. The method of claim 2, wherein the cost of transmission exceeds the cost threshold in response to communicating, by the node, via the first mode of communication at a data rate below a threshold data rate.

7. The method of claim 2, wherein the cost threshold is a measure of at least one of cost to battery life, cost to radio frequency performance, financial cost to achieve successful communication, or cost to end user functionality.

8. The method of claim 1, further comprising:
   responsive to selecting, by the node, a second condition subsequent to the first condition, selecting, by the node, a third mode of communication; and
   communicating, by the node, via the third mode of communication.

9. The method of claim 1, wherein the first mode of communication comprises one of the following:
   communication to an upstream node in a mesh network,
   communication to a data collector of a star network,
   communication to a mobile or handheld data collection device, or
   communication via a direct cellular connection, and
   wherein the second mode of communication comprises a different one of the following than the first mode of communication:
   communication to an upstream node in a mesh network,
   communication to a data collector of a star network,
   communication to a mobile or handheld data collection device, or
   communication via a direct cellular connection.

10. The method of claim 1, wherein the communicating, by the node, via the first mode of communication and the communicating, by the node, via the second mode of communication both comprise reporting resource consumption data.

11. The method of claim 10, wherein the resource consumption data comprises at least one of electricity consumption data, water consumption data, or natural gas consumption data.

12. The method of claim 1, wherein at least one of the one or more modes of communication includes multiple sub-modes.

13. The method of claim 12, wherein the multiple sub-modes are variants of the at least one of the one or more modes of communication, the multiple sub-modes comprising at least one of the following modification parameters:
   transmit power;
   data rate;
   protocol;
   modulation schemes; and/or
   forward error correction.

14. A utility network computing device of a utility network comprising:
   one or more processors;
   memory communicatively coupled to the one or more processors; and
   a mode module stored in the memory and executable by the one or more processors to:
     select a first mode of communication for the utility network computing device;

communicate resource consumption data with one or more other devices of the utility network via the first mode of communication;

responsive to determining a first condition, select a second mode of communication based at least in part on a priority order of a plurality of modes of communication, the priority order including a mesh network mode being designated higher priority than a star network mode, the star network mode being designated higher priority than a mobile mode, the first condition comprising a change in location of the utility network computing device; and communicate with the one or more other devices of the utility network via the second mode of communication.

15. The utility network computing device of claim 14, wherein the mode module is further executable by the one or more processors to:

responsive to determining a second condition subsequent to the first condition, select the first mode of communication for the utility network computing device and communicate via the first mode of communication.

16. The utility network computing device of claim 14, wherein the first mode of communication comprises one of the following:

communication to an upstream node in a mesh network,
communication to a data collector of a star network,
communication to a mobile or handheld data collection device, or
communication via a direct cellular connection, and
wherein the second mode of communication comprises a different one of the following than the first mode of communication:
communication to an upstream node in a mesh network,
communication to a data collector of a star network,
communication to a mobile or handheld data collection device, or
communication via a direct cellular connection.

17. The utility network computing device of claim 14, further comprising a metrology module stored in the memory and executable by the one or more processors to collect the resource consumption data, the resource consumption data comprising electricity consumption data, water consumption data, and/or natural gas consumption data.

18. The utility network computing device of claim 17, wherein the first condition comprises a cost of transmission exceeding a cost threshold, wherein the cost threshold is a measure of at least one of cost to battery life, cost to a rate of data transmission, cost to radio frequency performance, financial cost to achieve successful communication, or cost to end user functionality.

19. One or more computer-readable media storing instructions that, when executed by one or more processors of a node of a network, configure the node to:

select a first mode of communication for the network;
communicate with one or more other devices of the network via the first mode of communication;
query a data structure comprised of a priority listing for a plurality of modes of communication, each mode of the plurality of modes of communication having a predetermined priority rank, the priority listing for the plurality of modes of communication including a mesh network mode being listed higher priority than a star network mode, the star network mode being listed higher priority than a mobile mode;
identify a second mode of communication having a higher predetermined priority rank than the first mode of communication;
determine whether the second mode of communication has a lower-cost of communication relative to the first mode of communication; and
in response to determining that the second mode of communication has a lower-cost of communication relative to the first mode of communication, communicate with the one or more other devices of the network via the second mode of communication.

20. The one or more computer-readable media of claim 19, wherein the first mode of communication comprises one of the following:

communication to an upstream node in a mesh network,
communication to a data collector of a star network,
communication to a mobile or handheld data collection device, or
communication via a direct cellular connection, and
wherein the second mode of communication comprises a different one of the following than the first mode of communication:
communication to an upstream node in a mesh network,
communication to a data collector of a star network,
communication to a mobile or handheld data collection device, or
communication via a direct cellular connection.

* * * * *